United States Patent [19]
Wiklund

[11] Patent Number: 5,667,345
[45] Date of Patent: Sep. 16, 1997

[54] OPTICAL DEVICE AND METHOD FOR OBTAINING REFERENCE PLANES, ESPECIALLY FOR HAND-HELD TOOLS

[76] Inventor: Ernst Sigurd Gustaf Folke Wiklund, Lindevaegen 40, Stockholm, Sweden, S-12048

[21] Appl. No.: 532,590
[22] PCT Filed: Mar. 29, 1994
[86] PCT No.: PCT/SE94/00286
§ 371 Date: Sep. 29, 1995
§ 102(e) Date: Sep. 29, 1995
[87] PCT Pub. No.: WO94/22624
PCT Pub. Date: Oct. 13, 1994

[30] Foreign Application Priority Data

Mar. 30, 1993 [SE] Sweden ................................ 9301058

[51] Int. Cl.⁶ ........................................................ B23B 45/14
[52] U.S. Cl. .................... 408/1 R; 408/16; 408/113; 408/712
[58] Field of Search .................... 408/1 R, 16, 95, 408/112, 110, 113, 712

[56] References Cited

U.S. PATENT DOCUMENTS

| | | |
|---|---|---|
| 1,722,209 | 7/1929 | Gordon . |
| 1,800,209 | 4/1931 | Christopherson . |
| 2,477,916 | 8/1949 | Wilhide ................................ 408/712 X |
| 2,564,068 | 8/1951 | Kearns ........................................ 408/16 |
| 2,580,674 | 1/1952 | Griffin .................................. 408/16 X |
| 2,821,875 | 2/1958 | Buck .................................. 408/712 X |
| 3,250,153 | 5/1966 | Purkey ................................ 408/712 X |
| 3,436,155 | 4/1969 | Perin ......................................... 408/16 |
| 3,728,027 | 4/1973 | Watanabe . |
| 5,361,504 | 11/1994 | Huang ................................. 408/16 X |

*Primary Examiner*—Daniel W. Howell
*Assistant Examiner*—Henry W. H. Tsai
*Attorney, Agent, or Firm*—Pennie & Edmonds

[57] ABSTRACT

Method of direction control consisting in producing one or more parallel reference lines (7,8) that may be manipulated in such a way that their directions become parallel to the intended direction and with the help of plane mirrors making images (9,10) of the reference lines and images (12,13) of the object the straightening up of which is to be controlled. Implement for use at the method.

15 Claims, 3 Drawing Sheets

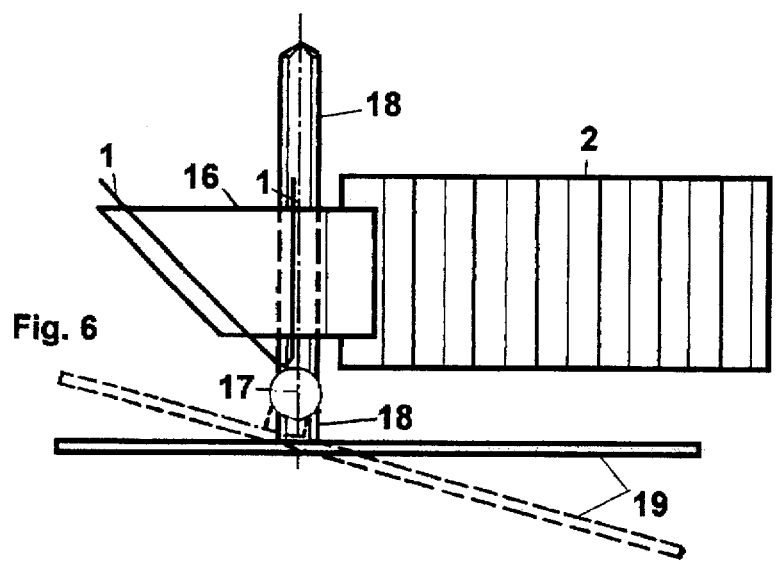
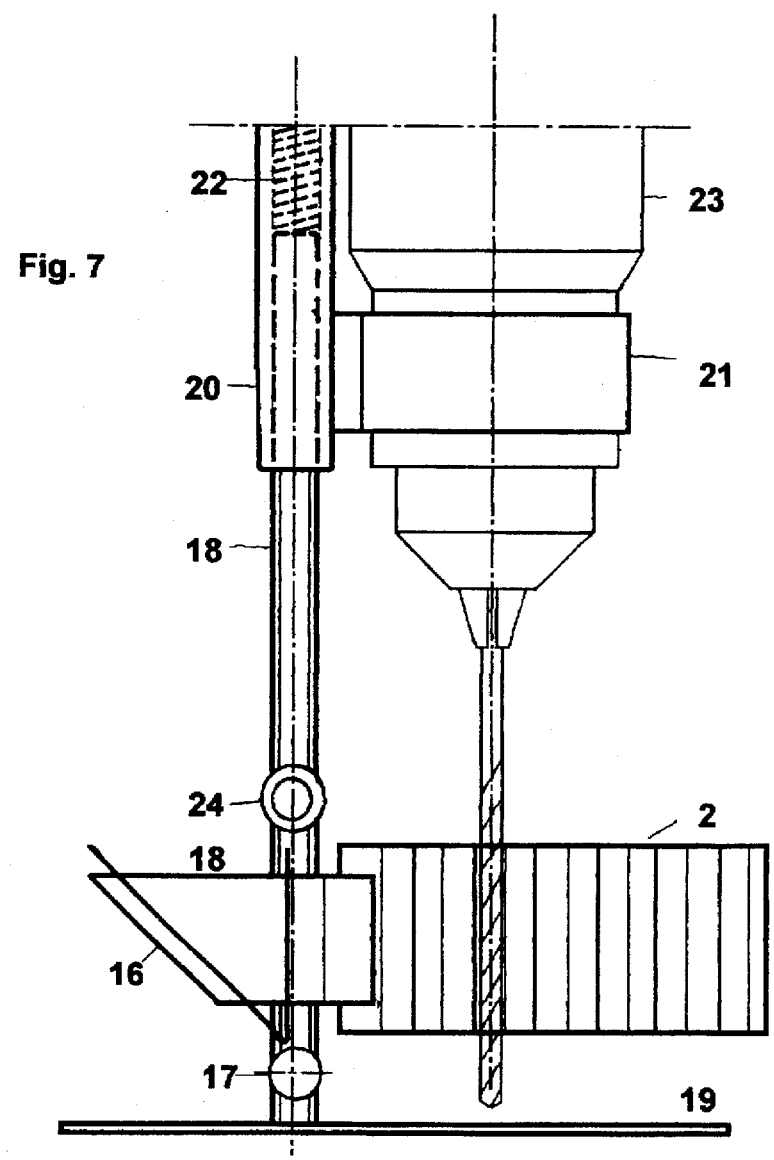

OPTICAL DEVICE AND METHOD FOR OBTAINING REFERENCE PLANES, ESPECIALLY FOR HAND-HELD TOOLS

TECHNICAL FIELD

The invention relates to a method and device for controlling and manipulating one or more parallel reference planes for use in the continuous alignment of hand-held tools.

BACKGROUND ART

When using hand-held drilling machines it is very difficult to see and control the drilling direction. Thus the result often becomes more or less slanting holes that make mounting difficult and the result ugly. Also in other cases, as erecting posts, fences and door frames, brick laying and similiar works problems of making the construction right occur. The problems are often of the art that one, for instance when drilling, must be able to adjust the direction during ongoing operation.

The implements for direction control in use still to-day are mainly the same as in older times and based upon set squares, plumb-lines, levels and similiar utensils. The problems and detriments that accompany those primitive methods are well known. They are useless for continous control. They often demand helpers and do not give possibility of control in more than one direction.

SUMMARY OF THE INVENTION

The present invention is aimed at solving the problem and concerns a new principle to observe and with security continously control direction in more than one plane, without eye movement, by using an optical system of mutually parallel reference lines and two slanting, reflecting, plane surfaces.

The system does not require special lighting above the normal one and may be designed either free-standing and independent of the machine used or as an easily mount- and demount-able accessory part to the machine. It may be used not only for horisontal and vertical erections, but also for erections with arbitrary angles against the horisontal and vertical planes. The optic is simple and does not contain any optically active, curved surfaces, i.e. no spherical lenses, spherical mirrors or like things. It is in principle parallax-free and has modest demands on eye position, which otherwise can be a problem at the use of optical systems.

The method according to the invention implays producing one or more with the intended direction parallell reference lines and letting the reference lines and the object, the direction of which is to be controlled, be imaged in one or more plane reflecting surfaces.

Usually one wishes to control direction in more than one plane. For this is needed at least two plane reflecting surfaces. To make it possible to see, simultanously, the images in more than one reflecting surface the surfaces have to form angles with each other. Further if one wishes to be able to see the images from an eye position close behind for instance a drilling machine the reflecting surfaces have to be slanting. The greatest precision is obtained if the angle between the base lines of the reflecting surfaces is right or nearly right, but other angles may be used if they from design or product technical reasons bring advantages that surpass the relatively small loss of precision.

BRIEF DESCRIPTION OF THE DRAWINGS

FIG. 6 shows a preferred design that makes control at oblique direction possible.

FIG. 7 shows a design of the implement according to FIG. 6 intended for mounting at a hand-held drilling machine.

DETAILED DESCRIPTION OF THE PREFERRED EMBODIMENTS

Figure 3:
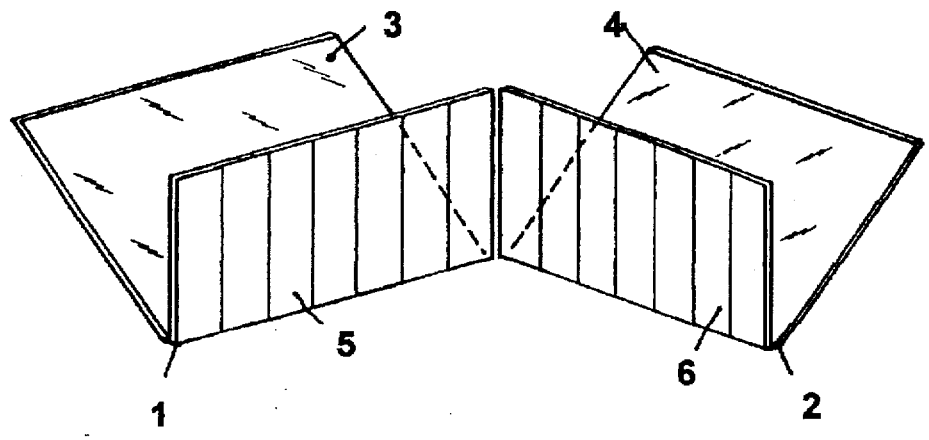
FIG. 3 is a sketch of the essential features of a preferred example of the invention.

The example of the invention shown in FIG. 3 can be described as two units (1) and (2) coupled, or able to be coupled, to each other at right angle. The implement is placed on or attached to the actual surface with the working point approximately symmetric between (1) and (2).

The essential elements of the units (1) and (2) consist of two transparent screens (5) and (6) equipped with mutually parallell reference lines (7 and 8) at right angle against the long sides of the screens. The screens are arranged perpendicularly against the base plane of the implement. Further two slanting (30°–60°, preferably 45°–50° angle) reflecting surfaces (3) and (4) are included.

Figure 1:
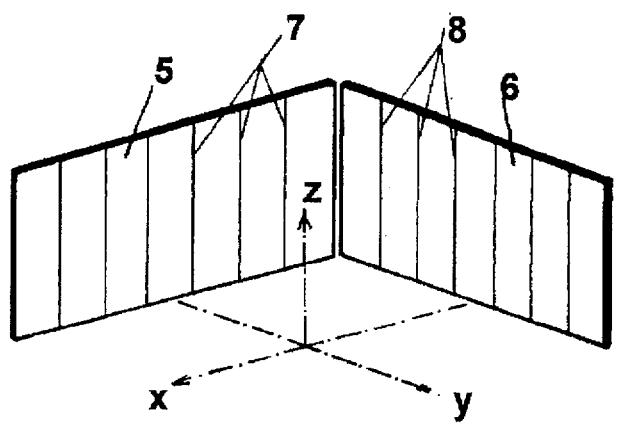
FIGS. 1 and 2 show the principles of a device according to the invention.
Figure 2:
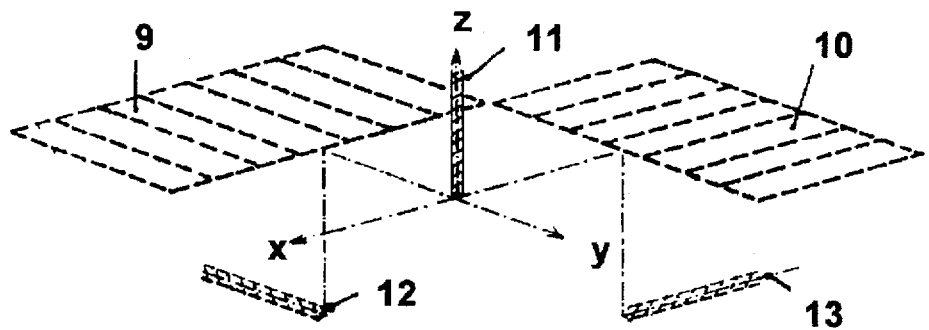

To make explanation easier FIGS. 1 and 2 include an orthogonal coordinate system with the origin at the working point and the axes x, y and z, where the x- and y-axes lay in and define the base plane and the z-axis represents the intended direction. FIG. 2 has for purposes of visuality a drill (11). When the rightening up is finished the drill direction coincides with the z-axis. By comparision with FIG. 1 it is clear that in this situation the drill direction is correct, when an eye, placed behind or in front of the transparent screen (5) and observing the reference lines (7) and the drill (11), sees the direction of the drill as parallell to the reference lines. The angle between the x-axis and the drill is then correct. At the same time information about the angle between the y-axis and the drill is missing. This information is obtained by the same procedure with respect to the screen (6) and the reference lines (8). To enable an operator to get simultanous information about the correctness of the angle between the x-axis and the drill respectively the y-axis and the drill a system is needed that creates images of the drill and the reference lines and makes it possible to look at those images simultanously. FIG. 2 shows such images created by a system of slanting, plane mirrors giving virtual images (9,10) of the reference lines (7,8) in the base plane and virtual images (12,13) of the drill in a plane situated below the base plane.

As already mentioned the control device according to the invention may be used for straightening up even at oblique angles to the working plane. This may be done by using a non-orthogonal coordinate system i.e. slanting the reference lines in one or both planes. A more preferred way is to use an orthogonal coordinate system i.e. to let the reference lines be perpendicular to the xy-plane and adjust the angle between it and the working surface.

A preferred design for straightening up at oblique angle to the working plane is shown in FIG. 6 where (16) is a corner piece that with the aid of a post (18) is joined to a foot plate (19). Between the foot plate (19) and the corner piece (16)

there is a knee joint (17). The knee joint (17) can be adjusted to and locked into desired position. For reasons of visuality the figure shows a hinge plane parallel to the y,z-plane. Generally a positioning at a plane situated between the y,z- and x,z-planes, for instance a plane through their intersection, might be preferred. By the appropriate design of the post (18) and the corner piece (16), for instance an octagonal post and the corresponding passage, the hinge plane can easily be adapted to, for each application, the appropriate place. In some cases there may be need for increasing respectively decreasing the height of the post between the joint and the corner piece. An appropriate way of doing this is to let the post pass the corner piece and equip the unit with suitable devices for fixing at desired levels.

In the design according to FIG. 7 the post (18) has been elongated and equipped with a steering (20) that via a cuff (21) has been fastened to the neck of the drilling machine (23). The steering keeps the post parallel to the axis of the drilling machine. Inside the steering the post is easily movable in axial direction. The upper end of the post is loaded by a spring (22). Between the steering (20) and the corner piece (16) the post (18) is provided with an easily movable ball joint (24). The extent of the ball joint's movements is normally situated within a swivel area of about 30°. The ball joint causes the whole foot plate to make contact with the ground surface, when the operator presses the machine against it. With the aid of the mirrors the operator can easily adjust any misdirection of the machine. The device may be designed in such a way that it is indicating drilling depth and thus replaces the depth indicators that are common on modern drilling machines. The holder that fixes the steering may be designed with a handle which provides a two-hand grip to the drilling machine.

The number of reference lines may be limited to just one. For the straightening up of posts, brick laying etc this reference line may be constituted of a hanging plumb-line and be part of a preferred embodiment of the invention.

At drilling etc. the use of just one reference line puts greater demands upon the orientation of the implement. A relatively large number of reference lines distributed in two planes that form right or nearly right angle to each other is preferred. The mutual distance and the length of the reference lines is adapted to the dimensions of the controlled object. The length of the planes is adapted to the need of free working space between the working point and the control implement.

The reference lines may be constituted of etched lines on transparent plates, but also of for instance a system with sticks designed as a comb. The lines may be made in ways other than etching. For vertical rightening ups an interesting alternative may be a system of plumb-lines or freely suspended bars. A number of other possibilities besides the mentioned would be obvious to a man of the art.

Figure 4:
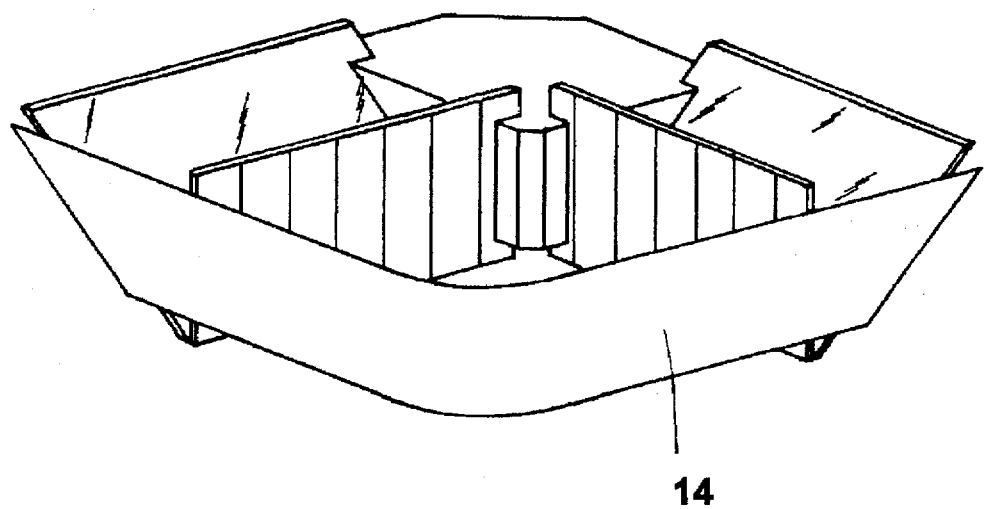
FIG. 4 is an especially preferred design, where the implement has been designed with a corner piece (16) and provided with a backing band to eliminate visual disturbances from the environment.
Figure 5:
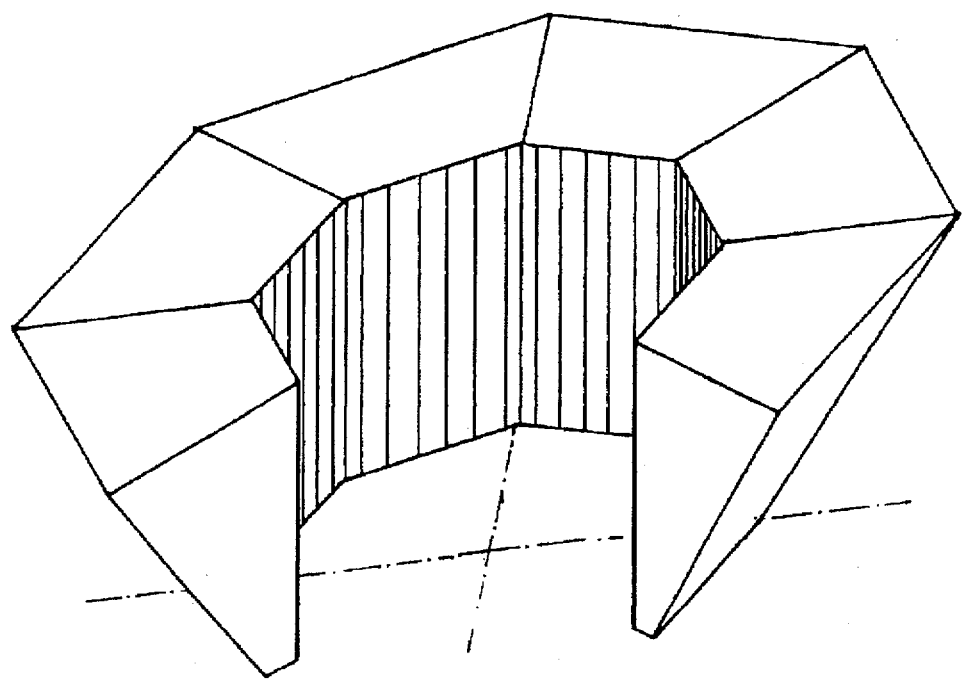
FIG. 5 is an alternative design, which may be better from the manufacturing point of view, but less preferred, if the main aim is highest possible precision.

Specially preferred designs include, beside reference line system and image producing means, a back shield to eliminate disturbing visual impressions from the environment that often may be very unruly. Such a shield is shown in FIG. 4, where the back shield is constituted of an easily flexible band (14) of metal or plastic with anchoring points at the ends of the units (1,2). A number of other possibilities would be obvious to a man of the art.

As the illumination conditions may be bad at places, where the implement is used, the design should be done in such a way that the reference lines and by means of this the reference line images get good contrast with the background. This may be done among other ways by the choice of color. Concerning transparent plates with etched lines the same effect may be obtained by giving the material different translucent properties.

A preferred device according to the invention meant for drilling consists of two angled planes with reference lines together with two oblique reflecting surfaces joined to the reference line planes. An device for sawing with for instance an electric circle saw may be constituted of the above mentioned components and beside that a reflecting surface applied at the saw blade.

The implement can be made of a number of different materials. Concerning smaller units, meant for instance for drilling, production by the casting of plastic of optical quality is an interesting alternative. One can then, by appropriate choice of angles, in order to get total reflexion, avoid the need of special preparation to make the surfaces reflecting.

For plastic casting it may be preferable to increase the number of planes in such a way that one obtains a horse shoe shaped design with more than two reference line planes.

If a design according to FIG. 3 is chosen the units (1,2) can be made foldable. This will reduce the need for space at storing between uses. The foldability may be achieved in several different ways. A simple, preferred way is to make the units joined to each other by appropiate design of the combining piece.

I claim:

1. A method for providing direction control to a hand held tool which comprises:

establishing, independently of the tool, one or more reference lines parallel to an intended working direction of the tool;

establishing images of the reference line or lines and of the tool; and aligning the image of the tool to the images of the reference line or lines to provide direction control to the tool.

2. The method of claim 1 wherein the images are established upon a reflecting surface which is positioned at an angle to the reference line or lines.

3. The method of claim 1 wherein the images are established on first and second reflecting surfaces which are positioned at an angle to the reference line or lines, wherein the first reflecting surface is positioned at an angle to the second reflecting surface.

4. The method of claim 3 which further comprises selecting the angle between the first and second reflecting surfaces to be substantially 90°.

5. The method of claim 2 wherein a plurality of reference lines are established upon at least one transparent surface positioned at an angle to the reflecting surface.

6. A device for providing direction control to a hand held tool which comprises:

means for establishing, independently of the tool, one or more reference lines parallel to an intended working direction of the tool; and means for establishing images of the reference line or lines and of the tool;

wherein the images of the tool can be aligned to the images of the reference line or lines to provide direction control for the tool.

7. The device of claim 6 wherein the means for establishing reference lines comprises a transparent plate which includes a plurality of parallel reference lines.

8. The device of claim 7 wherein the means for establishing images comprises a reflecting surface oriented at an angle to the transparent plate.

9. The device of claim 6 wherein the means for establishing reference lines comprises first and second transparent plates positioned and oriented at an angle to each other, each plate including a plurality of parallel reference lines.

10. The device of claim 9 wherein the means for establishing images comprises first and second reflecting surfaces positioned and oriented at an angle to the first and second transparent plates, respectively.

11. The device of claim 10 wherein each reflection surface is joined to the transparent plate at a base line, with the base line of the first transparent plate positioned at an angle with respect to that of the second transparent plate.

12. The device of claim 11 wherein the angle between the first and second transparent plates is substantially 90°.

13. The device of claim 6 which further comprises a post for holding both said reference line establishing means and image establishing means; a foot for engaging a work surface; and a joint connecting the foot to the post to allow rotational movement therebetween.

14. The device of claim 13 wherein the post further includes a holder for engaging the tool and a ball joint connecting the holder to the post to allow rotational movement therebetween.

15. The device of claim 6 wherein the reference line(s) are provided by one of plumb-line(s), bar(s), string(s) arranged in a frame, or a comb structure.

* * * * *